(12) United States Patent
Klapka

(10) Patent No.: US 6,557,293 B2
(45) Date of Patent: May 6, 2003

(54) FISH LURE

(76) Inventor: Ray Klapka, 2960 Hill Valley Dr., Escondido, CA (US) 92029

( * ) Notice: Subject to any disclaimer, the term of this patent is extended or adjusted under 35 U.S.C. 154(b) by 0 days.

(21) Appl. No.: 09/949,243

(22) Filed: Sep. 7, 2001

(65) Prior Publication Data

US 2003/0046856 A1 Mar. 13, 2003

(51) Int. Cl.$^7$ .............................................. A01K 85/00
(52) U.S. Cl. ...................................................... 43/42.06
(58) Field of Search ........................... 43/42.06, 42.08, 43/42.19, 42.22, 42.48, 44.99

(56) References Cited

U.S. PATENT DOCUMENTS

| | | | | |
|---|---|---|---|---|
| 1,351,669 A | * | 8/1920 | Mansfield | 24/601.3 |
| 2,674,823 A | * | 4/1954 | Gellings | 43/42.19 |
| 2,719,382 A | * | 10/1955 | Schachte | 43/42.06 |
| 2,741,057 A | * | 4/1956 | Morris et al. | 43/42.06 |
| 2,823,484 A | * | 2/1958 | Bousquet | 43/42.19 |
| 3,340,643 A | * | 9/1967 | Weimer | 43/42.12 |
| 4,006,552 A | * | 2/1977 | Cunningham | 43/42.48 |
| 4,133,134 A | * | 1/1979 | Cheng | 43/42.06 |
| 4,603,502 A | * | 8/1986 | MacDonald | 43/41 |
| 6,354,037 B2 | * | 3/2002 | Coppola, Jr. | 43/42.06 |

FOREIGN PATENT DOCUMENTS

| | | | | |
|---|---|---|---|---|
| DE | 41 14851 A1 | * | 12/1992 | A01K/85/01 |
| SE | 9501517 | * | 10/1996 | A01K/85/01 |

* cited by examiner

Primary Examiner—Charles T. Jordan
Assistant Examiner—Susan C. Alimenti
(74) Attorney, Agent, or Firm—John J. Murphey

(57) ABSTRACT

A bait-holding lure made of a front element, a rear element spaced-apart from the front element, a cage, defined by spaced-apart front open end and rear open end, the cage arranged between the front element and the rear element, the cage having a hollow interior forming a cavity for retaining a quantity of bait therein, the cage further defined by a perforated, contoured outer wall through which water may flow to carry the taste and scent of the bait into the surrounding water, and a spindle containing a straight portion arranged to pass axially through the cage, a first aperture formed in the front element, and a second aperture formed in the rear elements to hold them in axial alignment, the spindle further including a return bend forming one end of a bent segment spaced-apart from the spindle, the segment containing a bend and a hamulus for connection to the spindle under bias pressure from the return bend to hold the front element, the cage, and the rear element in close assembled formation on the spindle.

19 Claims, 3 Drawing Sheets

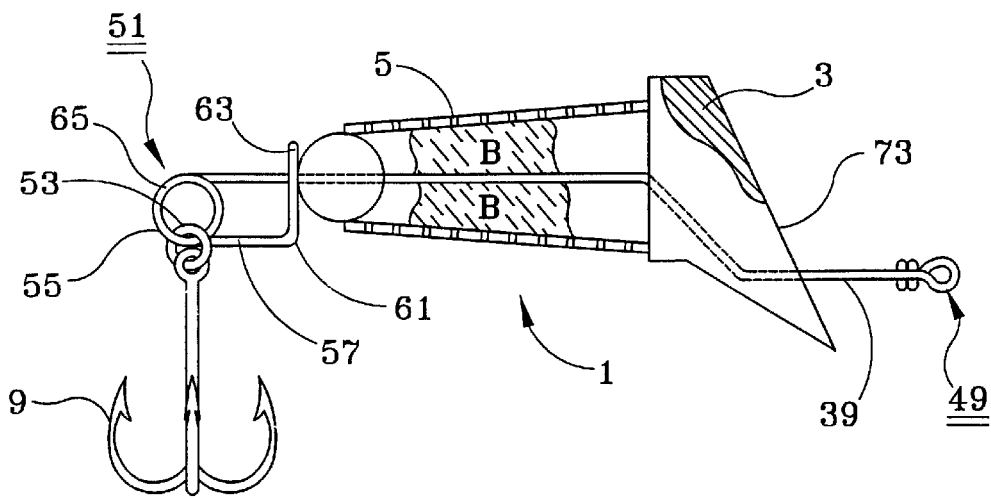
Figure 6
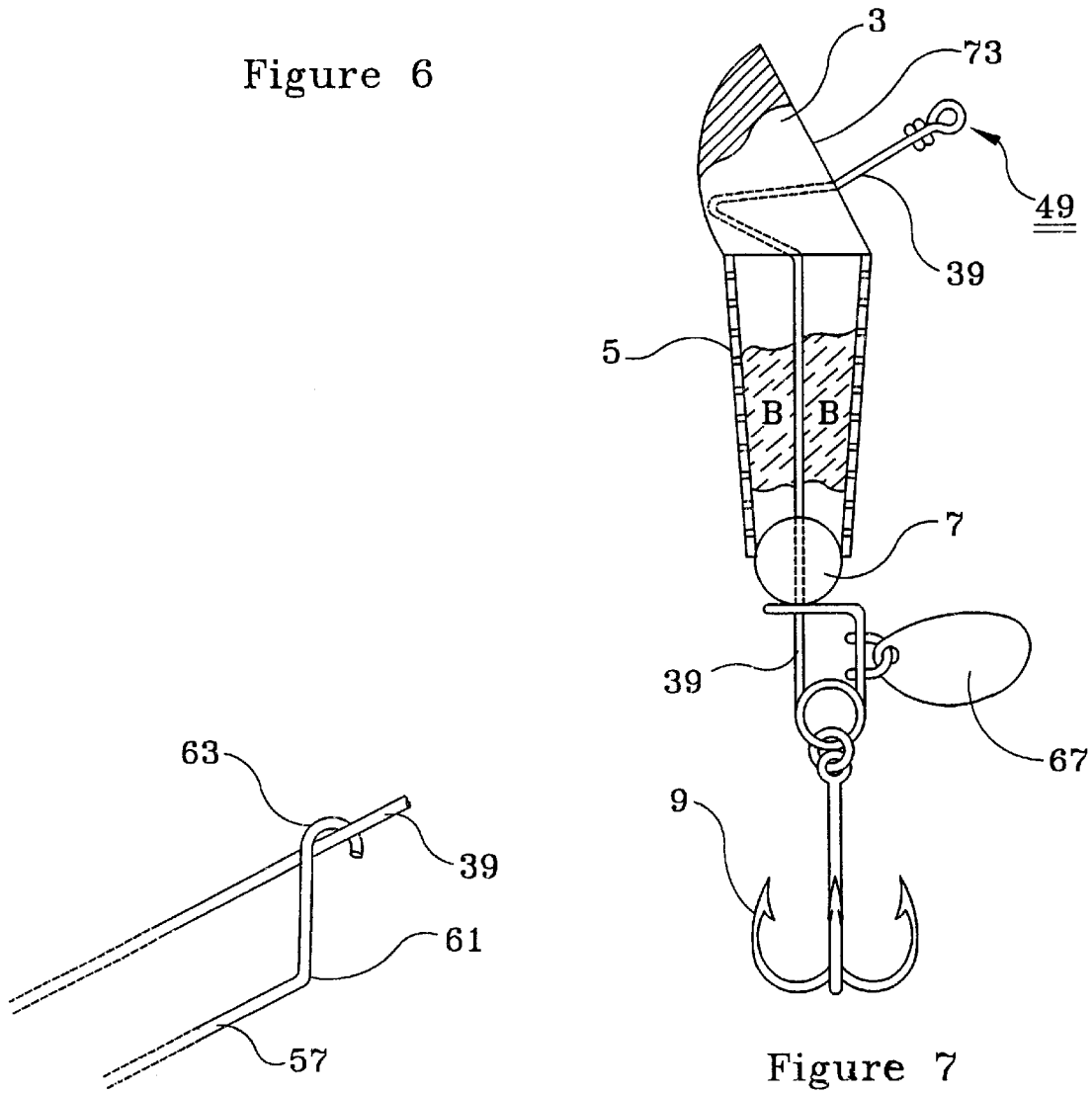
Figure 7
Figure 8

FISH LURE

BACKGROUND OF THE INVENTION

1. Field of the Invention

This invention pertains to the field of fishing equipment. More particularly, it pertains to a fishing lure for use with a fishing rod and reel and fishing line and has the unique ability to allow fish parts, cheese, fish eggs, worms and other such bait to be used with the lure to aid in attracting fish to the lure.

2. Description of the Prior Art

There are many ways to catch a fish, i.e., netting or trapping, poisoning, harpooning, stabbing, and using a rod, reel, and fishing line with lures to catch them. By far the most humane, but not necessarily the most efficient method, is to tow a lure through the water that mimics something fish may want to eat and, once bitten, impales the fish's mouth on a fish hook that is attached to the lure. Thus, the American sport of "fishing".

There are many types of fishing lures. There is the fly or streamer, which is a small hairy or feathery device that resembles the bugs and other insects that fall into the water and which fish like to eat. There are plugs, which are larger devices made of plastic or wood that are shaped and painted to resemble a fish or other aquatic inhabitant that larger fish desire to eat. There are spinners, which are generally small assemblies of wire, blades, trinkets and other elements that flash as they are pulled through the water to excite the fish into believing that smaller fish are inhabiting the local area around where the larger fish are gathered to feed.

With some lures, an added measure of success is achieved by attaching a piece of another, real fish ("bait") to the lure so that the blood, serum, scales, eggs, and other body elements and scents that attract fish, may be subjected to the flow of water over the element to elute these fish attractants into the water to attract the fish at a greater level than that of the visual appearance of the lure in the water.

For instance, in U.S. Pat. No. 3,529,376, a fishing lure is disclosed wherein worms and frogs may be impaled on fish hooks and used as bait and the lines leading from the hooks, called "snells", are gathered into a device that contains a stabilizer and a spinner that reflects light to attract the fish to the bait. In U.S. Pat. No. 4,993,183, a spinner-type lure is disclosed wherein a rubbery casting, in the form of a frog, fish, lizard or worm, is impaled on a hook and the hook-bait body clipped to the aft end of a spinner where the spinner is located forward of and to the side of the body. In U.S. Pat. No. 5,319,875, a lure is disclosed that includes a small cage wherein fish bait, such as fish eggs, are confined and a hook is disposed to the rear of the cage so that when the cage is towed through the water, water flows into and out of the cage carrying the scent of the eggs into the water behind the hook. This flow of scented water attracts fish to the rear end of the cage where the hook is located to catch the fish when it bites at the cage. Finally, U.S. Pat. No. 5,595,015 discloses another spinner type lure that has a spinner mounted forward of a housing that has a cavity formed in the rear end thereof for holding cheese-type material. A hook is located behind the cavity. Small holes in the sides of the housing allow water to flow into the cavity and out into the area surrounding the hook thus placing fish attractant next to the hook to lure the fish.

Each of these devices has serious limitations that have limited their use and acceptance in the fishing industry. One problem is with the intricacies associated with placing the bait on the hook or in the cage or cavity while in a boat or standing in a stream in weather that is less than perfect. A fisherman's hands get wet and slippery from repeated dunking in the water or in releasing fish from the hook. Much fishing is done in inclement weather where the low temperatures make fingers stiff and slow to respond, thus making snapping and unsnapping the parts of a lure a difficult and a time-consuming operation. Further, as one gets older and eyesight begins to fade, there is a general slowdown in movement of fingers notwithstanding whether the weather is warm or cold. In addition, some bait cavities are not designed to retain the bait inside the cavity causing chunks of the bait to fall or wash out of the cavity to reduce the effectiveness of the lure. Accordingly, there is always a need for a better fishing lure that is easier to clean, more effectively holds the bait therein, and treats the bait more gently to allow it to last throughout the entire fishing operation.

Another problem is keeping the assembly of lure parts together under the stresses of casting the lure, reeling it through the water, and fighting a fish that has captured it. In each of these situations, great stress is placed on the lure, especially on the assembled parts and, especially in the case of lures having a center spindle on which many parts, such as beads, cavitated housings, and spinners are mounted. The assembly is usually held together with a strong mechanical fitting. Unfortunately, this strong fitting makes it difficult to disengage in order to repair the lure or to refill the cavity with fresh bait.

Further, in most cases, a detachable connection is formed in the wire spindle that includes a return bend spaced-apart from a right angle bend formed in the wire and closely coupled to a U-shaped snap or hamulus formed at the end of the wire where the shank, or segment of the wire between the return bend and the right angle bend, is aligned parallel and closely spaced to the main wire spindle. This configuration is most often used to capture the hook on the end of the lure, as seen in U.S. Pat. Nos. 1,351,669; 1,522,451; 2,675,823; and 4,993,183. These configurations have not, to date, been used to solidify the assembly of parts of a lure and appear in the prior art to be only useful to capture a hook or other part of the lure and hold it in place. In addition, such a configuration, with its shank lying adjacent to and parallel with the central axis of the spinner, makes it difficult to open and close in cold, rainy weather due to the closeness of the shank to the main spindle wire.

In the case of U.S. Pat. No. 5,595,015, it is difficult to maintain the closing bead behind the cavity in a proper location, during slight tugs on the line, or when a fish is caught on the hook and is reeled on shore or into a boat, the cavity is subject to either being squeezed to a very small volume, thus expelling the bait, or to being opened such that the bait falls out. In the case of U.S. Pat. No. 5,319,875, the cage is completely unprotected and can be flattened by a fish during the strike so that the bait in the cage is totally expelled from the cage or crushed to such an extent that it washes through the holes in the cage. In some cases, it is difficult to open the small device to place more bait in the cavity or the cage. Further, these prior art patents allow only one end of the cage to be opened to clean out the cage of debris and to load new bait and require the use of a pick or other sharp object to be thrust inside the cage from the open end and used to dislodge any material remaining therein. It is most desirable to have the cage open at both ends for more easy cleaning, however, such a cage has yet to be developed.

SUMMARY OF THE INVENTION

This invention is a novel lure that overcomes the problems heretofore discussed and provides the fisherperson with a strong, long lasting, lure that holds bait in such a manner that it is not disturbed by the action of fish in biting or fighting. The artificial fishing lure of this invention comprises a front element, a rear element spaced-apart from the front element, a self-supporting hollow cage located between the front element and the rear element, the cage having a contoured outer surface and a hollow interior forming a cavity therein for carrying bait and further defined by a perforated wall throughwhich water may flow to carry the scent and taste of the bait into the surrounding water. A spindle having a straight first part is arranged to pass axially through the front element, the cage, and the rear element and to extend therebeyond, forming a means formed at one end for attachment to a fishing line, ahead of the front element, for drawing the lure through the water, and having a means formed at the opposite end thereof for attachment to a hook to the end of the rear element, wherein the spindle includes a return bend spaced-apart from an angled bend and a hamulus formed in the wire, and, in some cases, formed to pass along the outside of the lure components before clipping to the spindle to hold the assembled parts in close formation on the spindle. The hamulus is arranged to enter into disconnectible bias connection with the spindle at a position therealong to hold the front element, the rear element and the cage in aligned assembly.

The main benefit of this arrangement is that the spindle and the wire segment are separated by a space that allows easy access in pinching them together, especially in inclement weather, without fumbling with them which would happen should they be positioned closely adjacent to each other as in the prior art. Further, by opening only one clip, the entire lure can be disassembled yet retained on the spindle so that no parts fall off and that cold, stiff hands need only to place fresh bait in the cage, move the parts along the spindle close to each other, and then snap the hamulus over the spindle to lock the entire lure into proper assembly for instant re-use. Further, this arrangement allows both the front and rear ends of the cage to open to allow it to be flushed with water from either end and to be loaded with fresh bait from either end, a feat not possible with lures in the prior art.

In addition, the lure can be modified to allow placement of a spinner blade at various points along the spindle, to have the hooks replaced, and to be designed as a sinking lure, a floating lure, and a jig-type lure that may be easily bounced along the bottom of an ocean, a lake, river, stream etc.

The novel lure of this invention can be used as a deep water running lure or a floating lure by changing the density of certain parts in the assembly. Further, it can be made to dive below the surface of the water and return thereto by modifying the front portion of the lure. Still further, it can be made to pass at different depths of water by modifying the front portion and the overall weight of the lure. Finally, it may be designed to be used as a jig to be bounced from the bottom of the body of water upward a short distance and back down to the bottom by adjusting the spindle and the distribution of weight in the lure itself.

Accordingly, the main object of this invention is a lure in which fresh bait, such as fish parts, fish eggs, cheese, worms and other such attractants may be loaded and held therein, in a safe cage, while allowing turbulated water to pass over and/or through the cage and extract the scents and tastes from the bait to spread them into the water, enhancing the attractiveness of the lure to fish. Other objects of the invention include a lure that maintains the bait in a safe place, free from the dislodging effects of pulling the lure through water and/or fighting a fish that is hooked on the lure; a lure that contains a return bend-biased section of the central wire spindle that is spaced-apart from the main spindle and headed by a bend and a hamulus or hook arrangement for clipping back onto the spindle wherein the shank or segment portion between the return bend and the angled bend is designed to pass backward in spaced-apart arrangement from the return bend to make the two lengths of wire more easily pinched together to assemble and disassemble the lure; a lure that is held in full assembly on the spindle by the biased effect of the return bend, shank or segment, angled bend and hamulus combination so that when uncliped, the spindle is free to allow the components to slide therealong in aligned arrangement to free both the forward and rear ends of the cage so that it may be easily cleaned of debris and reloaded with fresh bait from either its front or rear ends.

These and other objects of the invention will become more clear when one reads the following specification, taken together with the drawings that are attached hereto. The scope of protection sought by the inventors may be gleaned from a fair reading of the claims that conclude this specification.

DESCRIPTION OF THE DRAWINGS

FIG. 6 is a side view, partially in section, of a diving embodiment of this invention;

FIG. 7 is a side view, partially in section, of a jig-type embodiment of this invention; and, FIG. 8 is a fragmentary view of the connection between the hamulus and the spindle of this invention.

DESCRIPTION OF THE PREFERRED EMBODIMENTS

Figure 1:
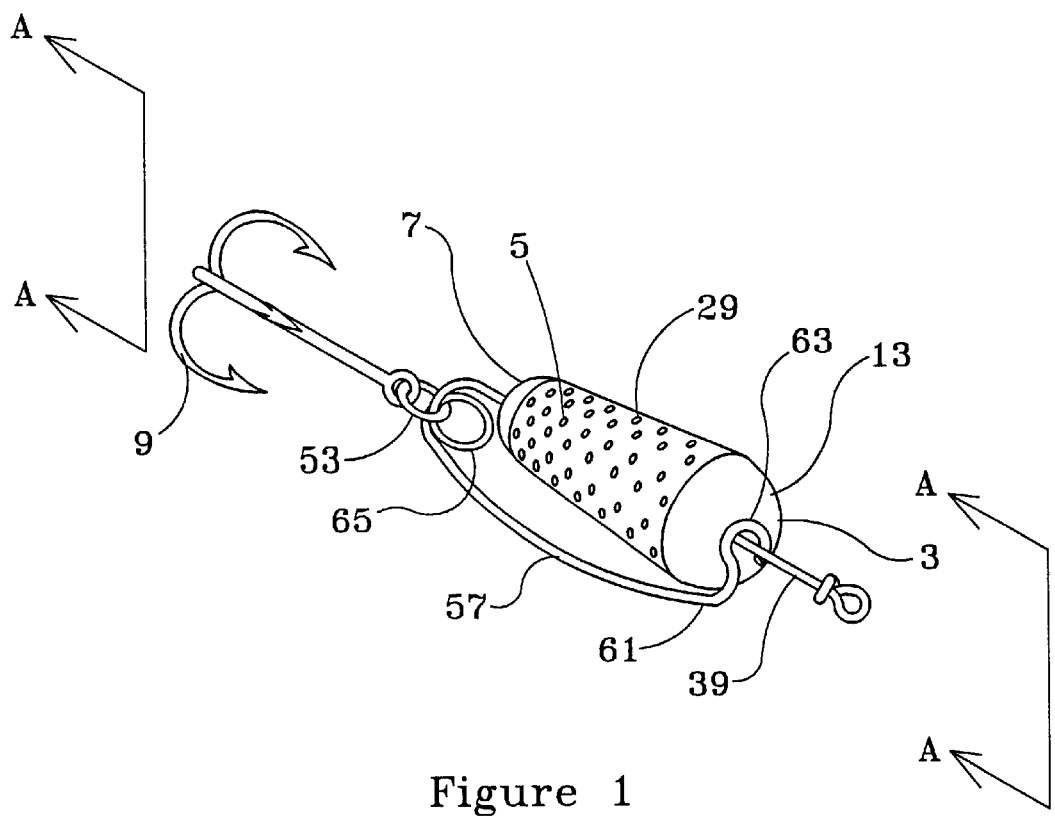
FIG. 1 is a perspective view of the preferred embodiment of this invention.
Figure 2:
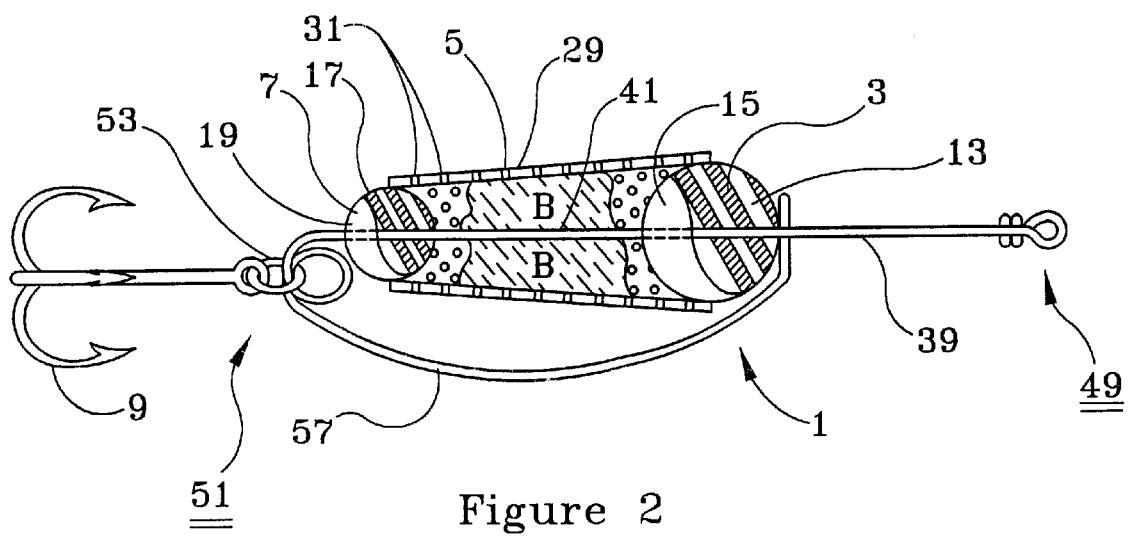
FIG. 2 is a side view, partially in section, of the preferred embodiment of this invention taken along lines A—A in FIG. 1.
Figure 3:
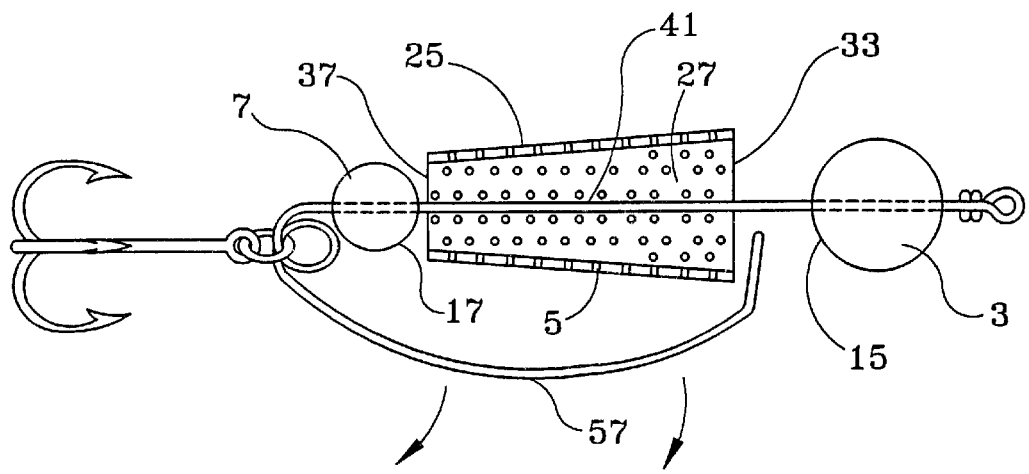
FIG. 3 is an exploded side view of the embodiment shown in FIG. 2.

Turning now to the drawings, wherein elements are identified by numbers and like elements are identified by like numbers throughout the eight figures, FIG. 1 shows the overall assembled preferred embodiment of the lure 1 of this invention to include a front element 3, that leads the lure through the water, a cage 5 located behind front element 3, a rear element 7 located at the rear end of cage 5, and a hook 9 located in the aft end of lure 1 behind rear element 7. In the partially sectional views of the lures in FIGS. 2 through 7, the same general assembly is shown. As shown in FIGS. 2 and 3, front element 3 has a generally round cross-sectional shape of a size that is determined by the additional functions of the lure which will be more fully explained hereinafter. In FIGS. 1–7, front element 3 is comprised of both a front surface 13 and a contiguous rear surface 15 to form the entire surface thereabout. In FIG. 1, front surface 13 and rear surface 15 are each shown to be hemispherical and front element 3 is spherical or oval in overall shape while in FIGS. 6–7 they take on different shapes as will be more fully explained later in this description.

Figure 4:
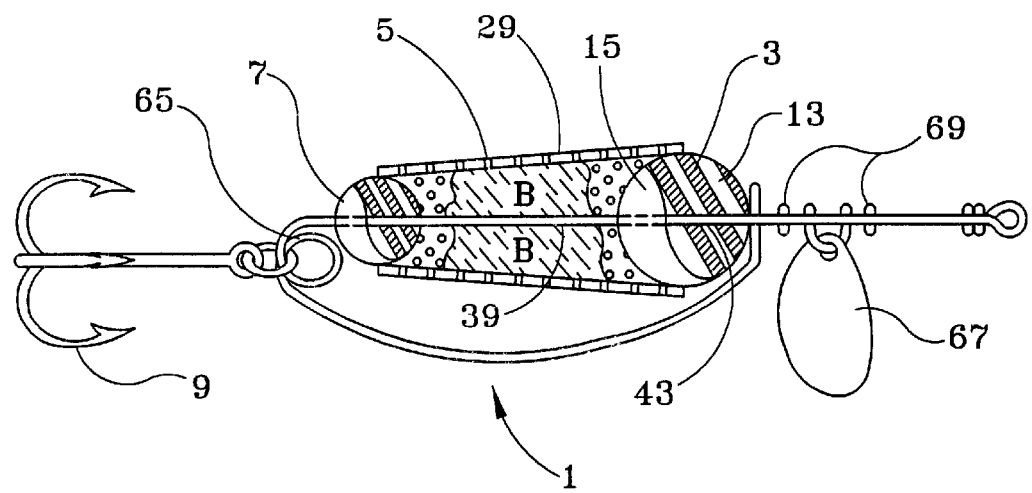
FIG. 4 is a side view, partially in section, of another embodiment.

In FIGS. 2–4, rear element 7 is shown to be made up of a front surface 17 and rear surface 19 each hemispherical and rear element 7 is spherical or oval in overall outline while in FIGS. 6 through 7 they take on different shapes as will be more fully explained later in this description.

A self-supporting hollow pod or cage 5 is located between front element 3 and rear element 7 and has an overall contoured outer surface 25 and a hollow interior forming a cavity 27 therein, for carrying bait (B). Cage 5 is further defined by a cage wall 29 that contains a plurality of perforations 31 throughwhich water may flow, in either direction, to carry the scent and taste of the bait contained in cage 5 out into the surrounding water. As shown in the figures, cage 5 is preferably contoured into a generally cylindrical outer shape. This feature, i.e., having openable front and rear ends, allows for more easy cleaning of cavity 27 at the end of fishing, and for more proper storage than those cages of the prior art having only one openable end. Cage 5 may be made from molded rigid or semi-rigid plastic, metal or other synthetic material. Front element rear surface 15 and rear element front surface 17 are each further characterized in that they mate with open ends 33 and 37 of cage 5, respectively, in a tight-fitting manner which does not allow bait to escape at these connections. Even though cage wall 29 is perforated, to allow the flow of water from outside cage 5 into cavity 27 and from inside cavity 27 back through the perforations to the outside, it is important to achieve a firm, close-fitting connection between cage front opening 33 and front element rear surface 15 and another firm, close-fitting connection between cage rear opening 37 and rear element front surface 17 to prevent losing the bait.

A spindle 39, preferably in the form of a length of strong, hard-to-bend wire is provided and characterized by having a straight first part or portion 41, arranged to pass axially and straight through a first aperture 43 formed in front element 3, through cage 5, and through a second aperture 45 formed in rear element 7. Spindle 39 extends beyond front element 3 and has a first means 49 formed at the front end of lure 1 for attachment to a fishing line (not shown) for drawing the lure through the water, and, further, has a 51, formed at the opposite, rear end of lure 1, such as a loop (as shown), for attachment to a hook means, such as treble hook 9, preferably through a small wire connector loop 53. The three elements, namely front element 3, cage 5 and rear element 7, arranged on spindle 39, plus hook 9, are in aligned assembly and are maintained in that configuration throughout the use of lure 1.

As shown in FIGS. 2–7, spindle 39 includes a return bend 55 forming a bent segment 57, headed by an elbow or angled bend 61, such as a near 90° angle, and terminated by an open end hook or hamulus 63. Between return bend 55 and bent segment 57 preferably is formed a complete loop 65. Hamulus or hook 63 is designed and arranged to enter into disconnectible bias interconnection with spindle 39 at a position therealong that holds or retains front element 3, cage 5 and rear element 7 in aligned and assembled order.

Figure 5:
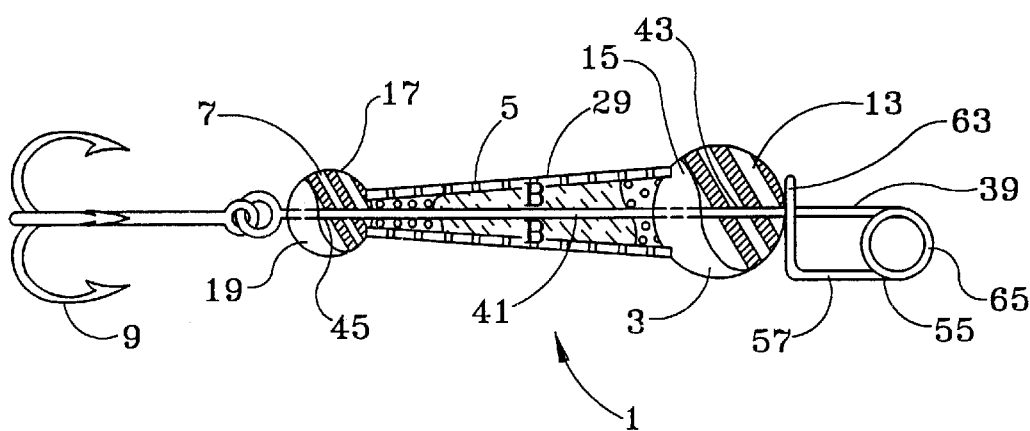
FIG. 5 is a side view, partially in section, of still another embodiment of this invention.

Return-bend 55 is made to set apart bent segment 57 from spindle 39, as shown in FIGS. 2–8 so that these wires are not positioned close together. Should they be close together, it would be difficult for the fisherperson to squeeze them to unsnap hamulus 63 from spindle 39, with cold, stiff fingers or under inclement weather conditions. Return-bend 55 is purposely arranged apart from spindle 39 and preferably formed to either pass around the outside of rear element 7, as shown in FIGS. 1–4, or pass backwards over spindle 39 in spaced-apart arrangement thereto, as shown in FIGS. 5–7. In both cases, the intersection between hamulus 63 and spindle 39 is such as to hold front element 3, cage 5, and rear element 7 in fixed compressed assembly on spindle 39. To insure that bent segment 57 is maintained in constant bias, spaced-apart arrangement with spindle 39 and not become undone or disconnected during use of lure 1, it is a preferred practice that, at the location of return bend 55, where bent segment 57 begins to pass backward over spindle 39, loop 65 is formed and positioned in the bend of return bend 55. Loop 65 provides more bias to bent segment 57 and makes the interconnection between hamulus 63 and spindle 39 a stronger, yet disconnectible, connection.

With the unique position of the intersection of hamulus 63 and spindle 39, lure 1 becomes quite easy to use while retaining the elements or parts thereof in aligned assembly. When loading cage 5 with bait, hamulus 63 is disconnected from spindle 39, by squeezing bent segment 57 against spindle 39. This is quite easy to do as the two wires are well spaced apart from each other. Once disconnected, front element 3, rear element 7, and cage 5 are easily parted on spindle 39 to loosen cage 5 from its connections with front element 3 and rear element 7 as shown in FIG. 3. Cage 5 can now be washed clean of debris and loaded or reloaded with fresh bait from either front end 33 or rear end 37. Once the bait is loaded in cavity 27, the three elements, 3, 5, and 7, merely slide along spindle 39 to close against each other and to close cage 5 front element rear surface 15 and rear element front surface 17 against their adjacent elements and hamulus 63 is closed against and hooked over spindle 39 to hold the parts together. Lure 1 now resembles a fish's prey and has the additional advantage of passing scent and taste into the water surrounding cage 5 to attract fish.

Two general modifications can be made to lure 1 to enhance its performance and remain within the spirit and scope of this invention. First is the placement of a spinner or flasher 67 somewhere on lure 1 with appropriate beads and bearings 69 that insure it will spin or swing as lure 1 is being drawn through the water as shown in FIGS. 4 and 7. Spinner 67 also helps to insure that the water flow over the outside of cage 5 is turbulated thus providing large amounts of unscented water to flow against cage 5, through perforations 31 and into cavity 27 to mix with the bait (B) and extract scents and tastes therefrom for passing outward through perforations 31 and into the surrounding water.

The second modification is to alter the materials of construction to make the lure perform differently in different areas of the water such as floating on top thereof, sinking below the surface, following along the bottom of the body of water, and jumping from one level to another in the water. As shown in FIGS. 2, 4 and 5, front element 3 is made of metal, such as lead, however other metals and other materials of construction can be used such as brass, aluminum, and various alloys of iron, plastic, synthetic rubber, cork and wood. Likewise, rear element 7 can be made of a similar range of materials. The different materials have different densities and specific gravities above and below 1.0 (water) and the choice of a particular material will determine the venue of operation of the lure in the water as well as affect the characteristics of the lure during use.

For instance, as shown in FIG. 6, front element 3 and rear element 7 are made of cork, wood or other light material such as plastic so that lure 1 is overall very light, despite the weight of metal hook 9. This combination will produce a floating or near-floating lure for use as a top-water lure. In a similar configuration as shown in FIG. 7, except for the added spinner 67, using a lead rear element 7 and a light-weight front element 3 will produce a lure that sits on the bottom of the body of water in an upright position. Having the front part of spindle 39 bent at an angle as shown, allows lure 1 to sit up on the bottom of the body of water and "jump up" when the fishing line is slightly pulled. Lure 1 then drops back down to the bottom of the body of water.

As shown in FIG. 2, front element 3 is made of metal while rear element 9 is made of lighter material, such as cork, wood or plastic to produce a lure with the characteristics of diving head first under water with hook 9 floating upward to produce a lure that either slowly dives under water or can be drawn through the water with its front portion angling downward to simulate a crippled prey. As shown in FIG. 5, both front and rear element 3 and 7 are made of metal or other heavy substance to produce a lure that sinks rapidly below the surface of the water and remains deep in the water during use. These types of lures are known as deep-running lures.

In another modification, as shown in FIGS. 6 and 7, front element 3 can be modified to include a slanted surface 73 at the front thereof. As this embodiment is being drawn through the water by fishing line attached to first means 49, slanted surface 73, while remaining hydrodynamic in nature, contacts the water and produces a non-axial flow to the water passing by lure 1 thereby causing lure 1 to dive or "shimmy", i.e., move rapidly or slowly from one side to the other, depending upon the choice of materials of the other elements. In these embodiments, spindle 39 may also be bent away from its axial direction, as it passes through front element 3, as shown in FIGS. 6 and 7, so that the connection with the fishing line is off-center or spaced-apart from the main axis of spindle 39 thus aiding in directing lure 1 to a path that is not in alignment with spindle 39. By the choice of material of construction of front and rear elements 3 and 7, this diving or shimmying lure can be made into a floating lure, a diving lure, or a deep running lure.

By making rear element 7 out of lead or some other heavy metal or substance that has a specific gravity greater than 1.0, and making front element 3 out of cork, wood or some other material that has a specific gravity less than 1.0, the lure will allow the hook to sit on the bottom of the body of water with the front element aimed upward as shown in FIG. 7. Should the front of spindle 39 have an angled offshoot, such as shown in FIG. 7, when the fishing line attached to means 49 is tugged, lure 1 will appear to jump upward, off the bottom of the body of water, and, when the fishing line is allowed to slacken, the lure will drop back down to the bottom imitating certain aquatic creatures that are sought out as food by fish.

While the invention has been described with reference to a particular embodiment, those skilled in the art will be able to make various modifications to the described embodiment of the invention without departing from the true spirit and scope thereof. It is intended that all combinations of elements and steps which perform substantially the same function in substantially the same way to achieve substantially the same result are within the scope of this invention.

What is claimed is:

1. A bait-holding lure comprising:
   a) a front element;
   b) a rear element spaced-apart from said front element;
   c) a self-supporting cage, defined by spaced-apart front open end and rear open end, said cage arranged between said front element and said rear element, said cage having a hollow interior forming a cavity therein for retaining a quantity of bait therein, said cage further defined by a perforated, contoured outer wall through which water may flow to carry the scent and taste of the bait into the surrounding water; and,
   d) a spindle containing a first, one-piece, straight portion arranged to pass axially through said cage, through a first aperture formed in said front element, and through a second aperture formed in said rear element to retain them in fixed axial alignment;
   e) said spindle further including a return bend forming a first end of a bent segment of said spindle spaced-apart from said first straight portion of said spindle, said bent segment arranged to pass over said cage and including means for connecting a second end to said spindle under bias pressure from said return bend to hold said front element, said cage, and said rear element in close assembled formation on said spindle.

2. The lure of claim 1 wherein said front element comprises a hydrodynamic front surface and a rear surface arranged to form a tight fitting connection with said cage front opening when assembled therewith on said spindle.

3. The lure of claim 1 wherein said rear element comprises a hydrodynamic rear surface and a front surface arranged to form a tight fitting connection with said cage rear opening when assembled therewith on said spindle.

4. The lure of claim 1 wherein said front element is made from materials selected from the group consisting of materials having a specific gravity less than 1.0 or materials having a specific gravity greater than 1.0.

5. The lure of claim 1 wherein said rear element is made from materials selected from the group consisting of materials having a specific gravity less than 1.0 or materials having a specific gravity greater than 1.0.

6. The lure of claim 1 wherein said return bend, forming one end of a segment spaced-apart from said spindle, includes an extra loop in said spindle to add extra bias pressure to said segment.

7. The lure of claim 1 wherein said means for connecting said segment to said spindle includes a bend in said bent segment and a hamulus located near said bend for connection to said spindle.

8. The lure of claim 7 wherein said bend is an angle bend.

9. The lure of claim 1 further including a spinner/flasher for location on said spindle, for spinning or swinging as the lure is drawn through the water, and a fish-catching hook, for connection to said spindle for towing behind said rear element as the lure is drawn through the water.

10. The lure of claim 1 wherein said bent segment is arranged to pass over said cage before being connected under bias pressure to said spindle.

11. The lure of claim 1 wherein said bent segment is arranged to pass over a length of said spindle before being connected under bias pressure to said spindle.

12. A bait-holding lure comprising:
   a) a front element including a hydrodynamic front surface and a rear surface;
   b) a rear element spaced-apart from said front element comprising a hydrodynamic rear surface and a front surface;
   c) a self-supporting cage, defined by spaced-apart front open end and rear open end, said cage front open end arranged for tight fitting connection to said rear surface of said front element, said cage rear open end arranged for tight fitting connection to said front surface of said rear element, said cage arranged between said front element and said rear element, said cage having a hollow interior forming a cavity therein for retaining a quantity of bait therein, said cage further defined by a perforated, contoured outer wall through which water may flow to carry the taste and scent of the bait into the surrounding water; and,
   d) a spindle containing a one-piece, straight portion arranged to pass axially through said cage and through a first aperture, formed in said front element, and through a second aperture, formed in said rear element, to hold said cage, said front element, and said rear element in non-rotational, fixed axial alignment;

e) said spindle further including a return bend forming one end of a bent segment spaced-apart from said spindle, said bent segment arranged to pass over said cage and containing means including an extra loop in said spindle, at said return bend, to add bias pressure to said bent segment for connection to said spindle through a hook to hold said front element, said cage, and said rear clement in close assembled formation on said spindle.

13. The lure of claim 12 wherein said front and said rear elements are made from materials having a specific gravity greater than 1.0 to make said lure a sinking lure.

14. The lure of claim 12 wherein said front element is made from materials having a specific gravity greater than 1.0 and said rear element is made from materials having a specific gravity less than 1.0 to make said lure a diving lure.

15. The lure of claim 12 wherein said front and said rear elements are made from materials having a specific gravity less than 1.0 to make said lure a floating lure.

16. The lure of claim 12 wherein said front surface of said front element contains a slanted portion to make said lure dive or move from side-to-side when drawn through the water.

17. The lure of claim 12 further including a segment of said spindle extending outward from said front face of said front element at an angle to the centerline of said spindle that passes axially through said rear element and said cage.

18. The lure of claim 12 wherein said cage is made from materials selected from the group consisting of metal, plastic or other synthetic materials.

19. A bait-holding lure comprising:

a) a front element, having a specific gravity greater than 1.0, and including a hydrodynamic front surface and a rear surface;

b) a rear element spaced-apart from said front element including a hydrodynamic rear surface and a front surface;

c) a cage having a generally cylindrical shape and defined by spaced-apart front open end and rear open end, said cage front open end arranged for a tight connection to said rear surface of said front element, said cage rear open end arranged for a tight fitting connection to said front surface of said rear element, said cage arranged between said front element and said rear element, said cage having a hollow interior forming a cavity therein for retaining a quantity of bait therein, and said cage further defined by a perforated, contoured outer wall throughwhich water may flow to carry the taste and scent of the bait into the surrounding water; and, d) a metal wire spindle containing a straight portion arranged to pass axially through said cage and a first aperture, formed in said front element, and a second aperture, formed in said rear element, to hold said cage, said front element, and said rear element in axial alignment;

e) said spindle further including a return bend forming one end of a segment spaced-apart from said spindle, said segment containing means including an extra loop in said spindle, at said return bend, to add bias pressure to said segment for connection to said spindle to hold said front element, said cage, and said rear element in close assembled formation on said spindle.

* * * * *